United States Patent

[11] 3,629,048

| | | |
|---|---|---|
| [72] | Inventor | Robert W. Davison<br>Wilmington, Del. |
| [21] | Appl. No. | 15,104 |
| [22] | Filed | Feb. 27, 1970 |
| [45] | Patented | Dec. 21, 1971 |
| [73] | Assignee | Hercules Incorporated<br>Wilmington, Del. |

[54] REINFORCED PAPER SHEETING
4 Claims, 2 Drawing Figs.

[52] U.S. Cl................................................ 161/57,
15/209, 156/179, 156/291, 161/141, 161/142,
161/148, 161/156, 161/402
[51] Int. Cl...................................................... A47i 17/00,
B32b 5/12, B32b 5/26
[50] Field of Search............................................. 15/209;
161/57–59, 85, 141, 142, 148, 156, 402; 156/179,
291

[56] References Cited
UNITED STATES PATENTS

| | | | |
|---|---|---|---|
| 2,620,851 | 12/1952 | Brown............................ | 161/79 X |
| 2,773,503 | 12/1956 | Brownlee et al.............. | 161/170 UX |
| 3,025,199 | 3/1962 | Harwood....................... | 161/129 X |
| 3,485,705 | 12/1969 | Harmon......................... | 161/59 |
| 3,546,056 | 12/1970 | Thomas......................... | 161/57 |

*Primary Examiner*—William A. Powell
*Attorney*—Charles L. Board

ABSTRACT: Disclosed is reinforced paper sheeting having high resistance to tear. An assembly is prepared by sandwiching a nonwoven scrim between at least two plies of undried water-laid woodpulp fibers. The assembly is then subjected to moderate pressure and subsequently dried.

PATENTED DEC 21 1971  3,629,048

ROBERT W. DAVISON
*INVENTOR.*

BY *Charles L. Board*
ATTORNEY

REINFORCED PAPER SHEETING

This invention relates to reinforced paper sheeting having high resistance to tear.

An object of this invention is a relatively inexpensive reinforced paper sheeting having high tear resistance adapted for use in the manufacture of packaging materials, such as bags; disposable cleaning cloths; and the like.

Other objects of this invention will, in part, be obvious and will, in part, appear hereinafter.

For a complete understanding of the nature and the objects of this invention, reference is made to the following detailed description and drawing in which.

Figure 1:
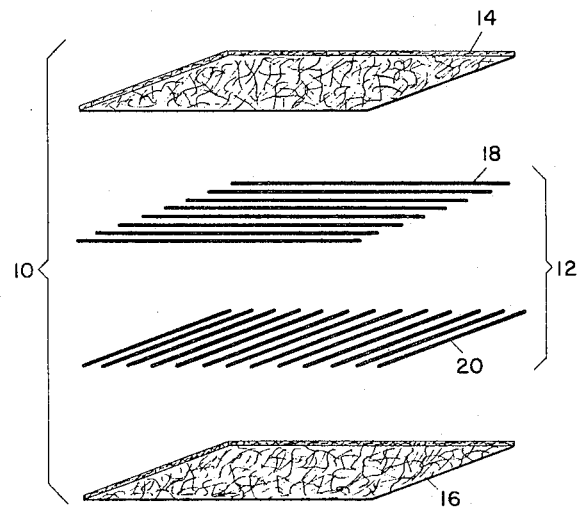
FIG. 1 is an exploded diagrammatic view of an assembly of plies of undried water-laid woodpulp fibers and a scrim prior to the application of pressure and subsequent drying.
Figure 2:
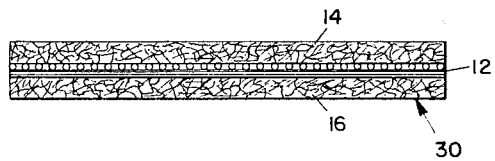
FIG. 2 is a cross section through a reinforced paper sheet prepared from the assembly shown in FIG. 1.

In accordance with this invention there is provided reinforced paper sheeting and a method for preparing the same.

The reinforced paper sheeting of this invention is a composite structure which is comprised of an inner reinforcing, nonwoven ply and at least one outer ply of woodpulp fibers disposed on each side of the inner reinforcing ply. The outer plies are bonded to one another through openings in the inner ply and are essentially unbonded to the inner ply.

The inner reinforcing nonwoven ply, hereinafter referred to as the "scrim," has openings or interstices therein and is comprised of at least two webs, the webs being comprised of essentially unbonded continuous monofilament strands. The scrim will be detailed more fully hereinafter.

The method for preparing the reinforced paper sheeting comprises sandwiching a nonwoven scrim between at least two plies of undried water-laid woodpulp fibers to provide an assembly which is then subjected to moderate pressure and dried. During application of the pressure, portions of the two outer plies adjacent the scrim make contact through openings or interstices in the nonwoven scrim and become bonded to one another at these points of contact through the natural bonding and adhesive properties possessed by woodpulp fibers.

The outer plies are essentially unbonded to the scrim. At most, any bond between the scrim and outer plies that may result from the natural bonding and adhesive characteristics of the woodpulp fibers is a poor bond while the bond obtained between the outer plies is a good bond. Thus, the strands of the webs of which the scrim is comprised, being either unbonded or only lightly bonded to one another and to the outer plies, are free to move when external stress is applied. Thus, for example, when an external stress is applied that would tend to tear the reinforced paper sheet, the strands, being free to move, move back, bunch up and reinforce one another and thus provide a rapidly mounting resistance to further tear.

The plies of woodpulp fibers are prepared by the water-laying process prior to assembly of the composite structure. Any conventional water-laying process can be employed. A composite structure is then prepared by sandwiching the scrim between at least two plies of the woodpulp fibers while they are still wet. That is, the plies are not dried before assembly and the application of pressure.

The scrim is comprised of at least two webs, each of the webs being comprised of a plurality of essentially unbonded substantially parallel, low denier, continuous, monofilament strands of a synthetic thermoplastic hydrophobic material. For ultimate strength properties, the strands of one web will preferably be at an angle of between about 45° and 90° with the strands of at least one other web. For the purposes of this invention, the individual strands of the webs of which the scrim is comprised must be free to move readily under impact or when external stresses are applied to reinforced paper sheeting. Thus it is preferred that the strands of one web not be bonded to the strands of another web. If, for handling purposes, it is desirable to bond the strands of one web to the strands of another web, then the individual bonds should be of relatively low strength so as to permit the strands to readily break away from one another when an external stress is applied. Thus, all the strands of the scrim have substantial freedom of movement.

The scrim can be comprised of more than two webs if desired. However, the strands of one web will be so arranged as to make an angle of between about 45° and 90° with the strands of at least one other web. Thus, the scrim can be comprised of three webs, four webs, five webs, six webs, or more if desired; the webs having the properties described above. The individual strands can have a denier of from about 2 to about 50, and preferably from about 5 to about 30. Preferably, the strands will have high tenacity of the order of from about 1 gram to 8 grams per denier.

The strands of the webs of the scrim are prepared from a synthetic thermoplastic hydrophobic material. Examples of suitable materials include the polyolefins such as polyethylene, polypropylene, and poly(butene-1); EPM; EPDM; poly(vinylidene chloride); copolymers of vinyl chloride and vinyl acetate; nylon; the polyesters such as poly(ethylene terephthalate); polyacrylonitrile; and cellulose esters such as cellulose acetate and cellulose butyrate.

The strands of the individual webs of the scrim can be of the same or different synthetic thermoplastic hydrophobic material. The strands can be of different denier and/or of different tenacity. All the strands of the webs of which the scrim is comprised can be of the same synthetic thermoplastic hydrophobic material. In addition, the strands of one web can be of one material and the strands of another web can be of a different material.

A web comprised of substantially parallel continuous monofilament strands that can be used to prepare the reinforced paper sheeting of this invention is the product resulting from fibrillation of striated film of such materials as polypropylene; nylon; polyesters such as poly(ethylene terephthalate); and acrylics such as polyacrylonitrile. Films of blends of these materials can be used. Also a bicomponent film can be used.

The concept of fibrillating a striated film has recently been introduced into the textile art as a method of preparing low denier monofilaments or strands. The striations in such a film provide precisely defined lines of weakness in a direction substantially parallel to the longitudinal axis of the film, i.e., parallel to the direction of orientation. When this oriented, striated film is subjected to mechanical working to cause splitting, such splitting is confined to the thin areas and the thick areas can be separated as continuous strands or filaments. The mechanical working can be sufficient to effect a complete fibrillation of the film. In such a case, the product is a web comprised of a plurality of individual, unconnected, parallel, continuous strands.

If the mechanical working is discontinued prior to complete fibrillation, the product is a web comprised of a network of essentially parallel continuous strands interconnected by means of tiny side fibrils, the fibrils being the residue of the thin areas of the striated film. The tiny side fibrils do not restrict to any substantial degree the freedom of movement of the continuous strands.

A striated film which is fibrillated for use in this invention comprises a thin strip of thermoplastic material such as polypropylene, which is provided with a series of substantially uniformly spaced parallel ribs running longitudinally thereof and interconnected by thin areas or areas of reduced thickness. The film is oriented uniaxially in the direction parallel to the ribs. With uniaxial orientation, the tensile strength in the direction of the axis of orientation is greatly increased while the strength transversely is reduced so that the film can be readily split lengthwise. In comparison with the areas of reduced thickness, the ribs have a relatively high resistance to splitting, so that lengthwise splitting of the film is confined to the areas of reduced thickness and the resulting filaments or strands correspond generally to the ribs.

As indicated above, a striated film can be completely fibrillated to the point where each filament or strand is an entity totally unconnected to an adjacent filament, or it can be only partially fibrillated to form an expandable network structure. Either the partially or completely fibrillated product can be employed in the preparation of the scrim.

Referring now to FIG. 1 of the drawing, there is shown an exploded diagrammatic view of a stacked arrangement of plies 10 comprised of scrim 12 and outer plies 14 and 16 of undried water-laid woodpulp fibers. Scrim 12 is comprised of 2 webs, 18 and 20. The webs are comprised of a plurality of substantially parallel, low denier, continuous monofilament strands. If a web is the product resulting from complete fibrillation of striated film the strands will be unconnected; if, as above set forth, mechanical working is discontinued prior to complete fibrillation of the striated film, at least some of the strands will be interconnected by means of tiny side fibrils which do not restrict to any substantial degree the freedom of movement of the strands. It is not essential that the strands be uniformly spaced or that all strands be spaced from one another. Thus, for example, when a web is the product resulting from fibrillation of striated film, several strands of the web may be adjacent one another in flat bundles of from about two to about five strands with no substantial spacing between the strands of the bundle and the web may be comprised of several of these flat bundles spaced from one another and/or from single strands.

Moderate pressure is then applied to form reinforced paper sheet 30. Pressure applied will usually be of the order of from about 10 to 500 p.s.i. The formed assembly is subsequently dried at temperatures of from about 140° to about 300° F. Reinforced paper sheet 30 is comprised of outer plies 14 and 16 and scrim 12, the outer plies 14 and 16 being bonded together through openings in the scrim by means of the natural bonding and adhesive properties of the woodpulp fibers, the strands of scrim 12 being essentially unbonded to one another and to the outer plies 14 and 16.

The following example is illustrative of this invention.

EXAMPLE 1

Two water-wet plies (9 inches × 9 inches) of bleached kraft soft woodpulp fibers (beaten to a Schopper-Riegler freeness of 747 ml.) are formed on a 100-mesh screen. A scrim (about 9 inches × 9 inches) is sandwiched between these two water-wet plies—screen combinations, the water-wet plies being adjacent the scrim to provide an assembly in which the 100-mesh screens form the outer layers. The scrim has a basis weight of 0.125 oz./sq. yd. and is prepared from a striated polypropylene film. The striated film is stretched, fibrillated, and spread laterally to form a filamentary web of essentially parallel, continuous monofilament strands. A portion of this web is crossoverlaid with another web portion at approximately right angles to provide the scrim. The monofilament strands of the webs are about 20 denier and have a tenacity of about 5.3 g./denier. The assembly is then subjected to moderate pressure and dried to remove substantially all water. The 100-mesh screens are then removed. The resulting reinforced paper sheeting has high-strength properties. The following example is for comparative purposes.

EXAMPLE 2

Example 1 is repeated with the exception that no scrim is employed.

Table I below sets forth certain properties of the sheets of examples 1 and 2.

TABLE I

| Example | 1 | 2 |
| --- | --- | --- |
| Scrim (% by weight) | 6.6 | None |
| Basis wt. (lbs./3,000 sq. ft.) | 43.26 | 42.80 |
| Tensile (lbs./in.) | 21.3 | 23.0 |
| Elongation (%) | 2.35 | 2.6 |
| Elmendorf Tear (grams) | 478 | 80.4 |
| Mullen Burst (p.s.i.) | 37.0 | 44.9 |
| Thickness of sheet (mils) | 6.2 | 5.3 |

The water-wet plies are prepared by the water-laying process using an aqueous slurry of wood pulp fibers. If desired, various known papermaking additives such as wet-strength resins, size materials, filler materials and the like, can be added to the aqueous slurry prior to formation of the water-wet plies.

It is to be understood that the above description, drawing, and examples are illustrative of this invention and not in limitation thereof.

What I claim and desire to protect by Letters Patent is:

1. Reinforced paper sheeting comprised of a nonwoven scrim comprised of at least two webs, each web being comprised of a plurality of essentially unbonded substantially parallel, low denier, continuous monofilament strands of a synthetic thermoplastic hydrophobic material and at least two outer plies of wood pulp fibers bonded to one another through openings in the scrim, said bond being effected only by the natural bonding and adhesive characteristics of the wood pulp fibers, the said outer plies being essentially unbonded to the strands of the scrim whereby the scrim strands are free to move and distribute applied stress.

2. The nonwoven fabric of claim 1 when the strands of one of the webs of the scrim make an angle of between about 45° and 90° with the strands of at least one other web.

3. The nonwoven fabric of claim 2 wherein at least one of the webs of which the scrim is comprised is a fibrillated striated film of a synthetic thermoplastic hydrophobic material.

4. The nonwoven fabric of claim 3 wherein the synthetic thermoplastic hydrophobic material is a polymer of propylene.

* * * * *